Oct. 18, 1966 W. F. SWIGER 3,279,200
CRYSTALLIZATION OF SOLVENT FROM SOLUTION
Filed Feb. 26, 1962 3 Sheets-Sheet 1
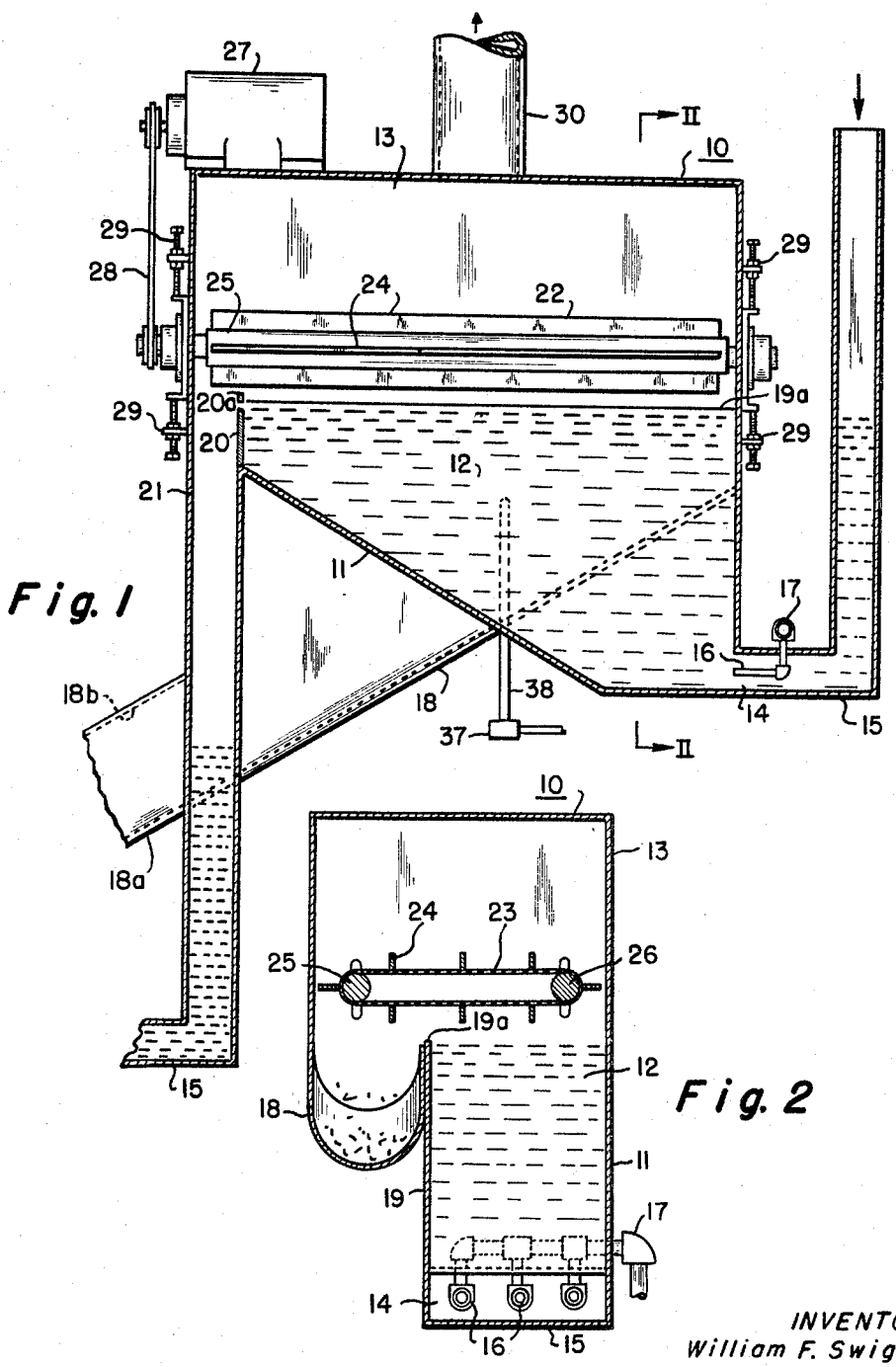
INVENTOR.
William F. Swiger
BY
Green, McCallister & Miller
HIS ATTORNEYS

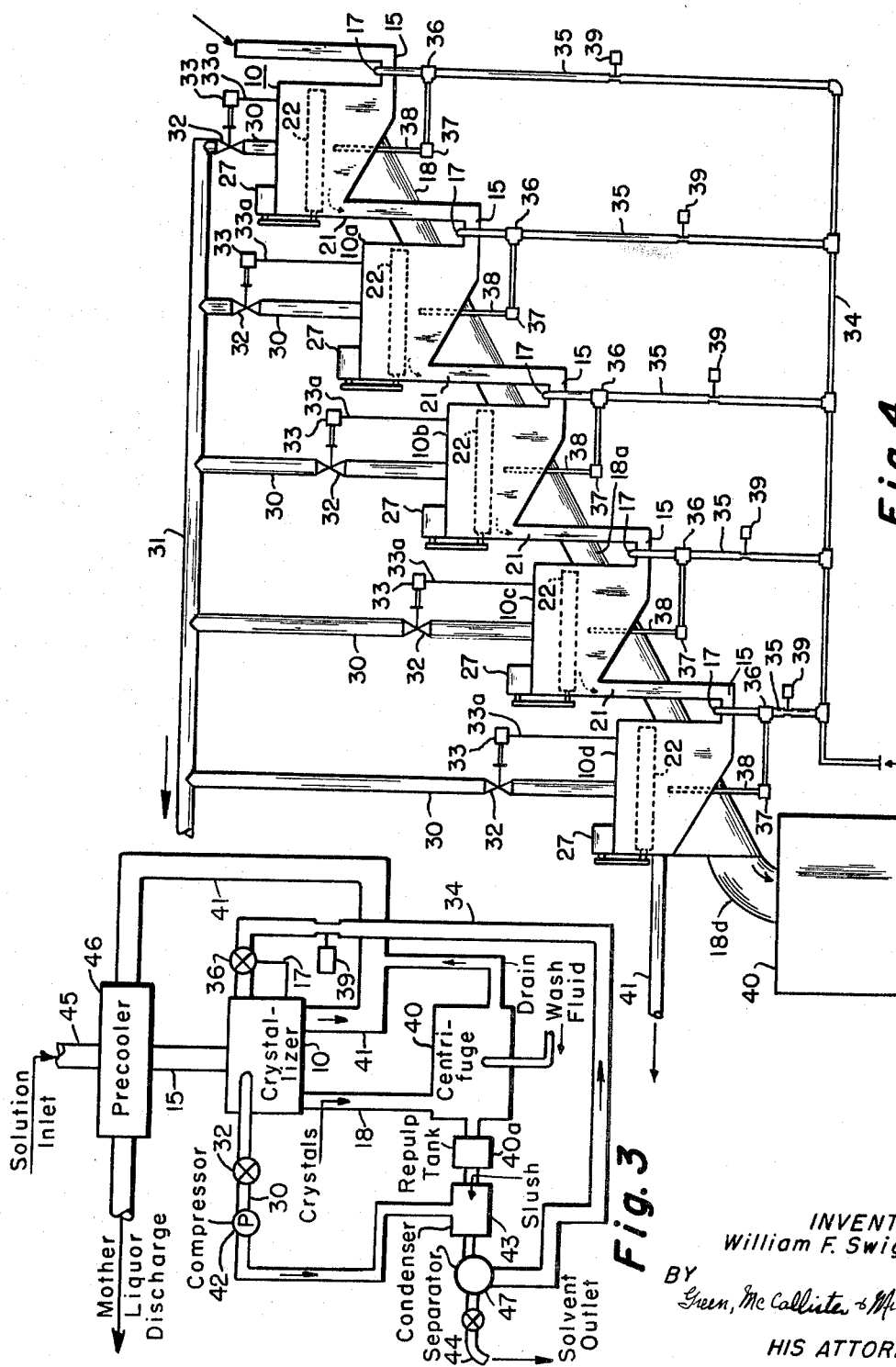

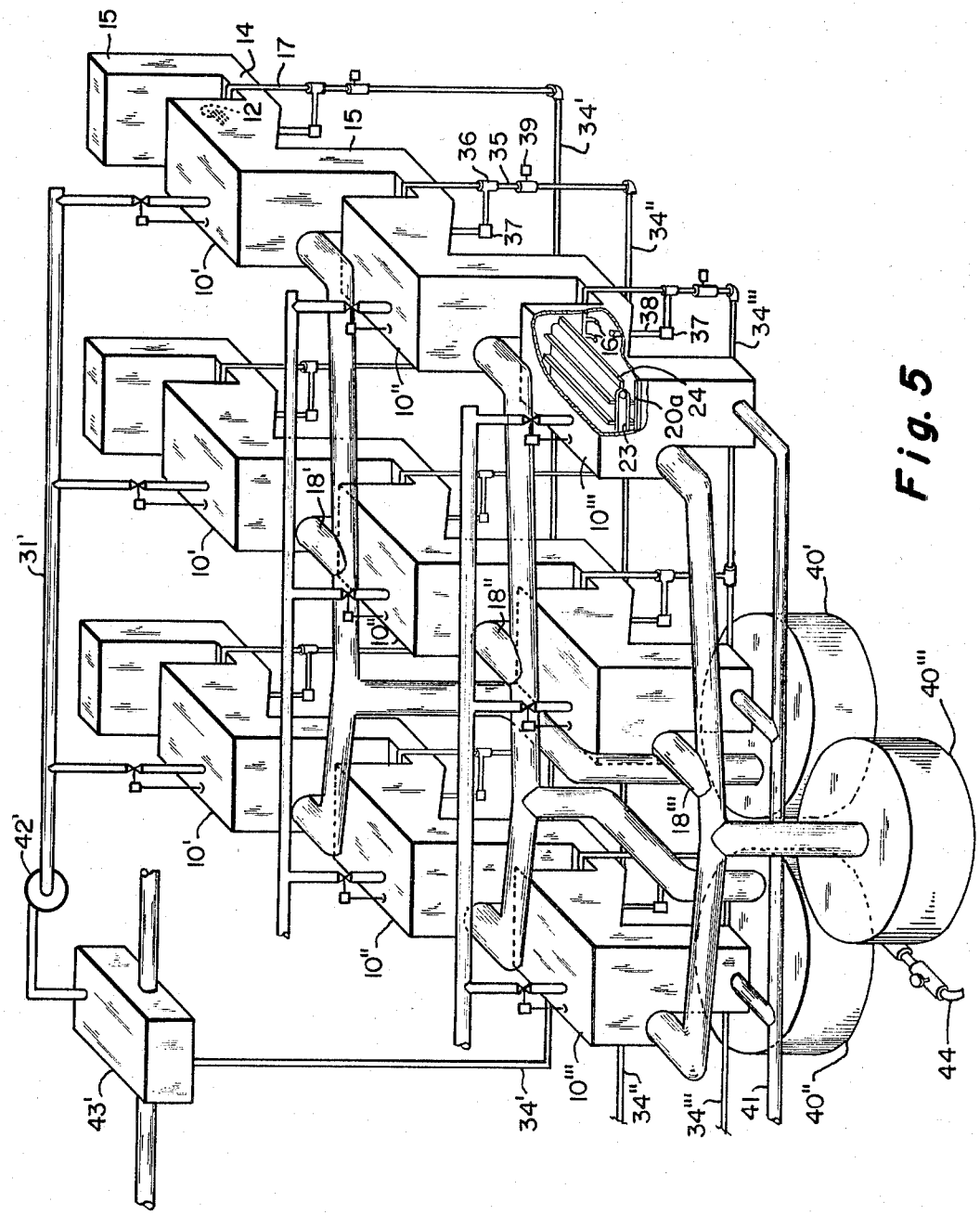

United States Patent Office 3,279,200
Patented Oct. 18, 1966

3,279,200
CRYSTALLIZATION OF SOLVENT FROM SOLUTION
William F. Swiger, Warren, Pa., assignor to Struthers Scientific and International Corporation, New York, N.Y., a corporation of Delaware
Filed Feb. 26, 1962, Ser. No. 175,605
2 Claims. (Cl. 62—58)

The present application is a continuation-in-part of my copending application, Ser. No. 107,471, filed May 3, 1961, for "Crystallization of Solvent from Solution."

This invention relates to the extraction of solvent from solution and more particularly, to an improved method of, and apparatus for crystallizing a solvent for removal from a solution by controlling the vaporization of a volatile liquid coolant injected directly into the solution.

A phase of my invention relates to the use of liquid alkenes, such as butene, as an evaporable coolant. I have discovered that liquid alkenes have the desirable properties of immiscibility and low recompression pressure requirements that make their use in solvent extraction processes, such as those herein disclosed, particularly advantageous.

Another phase of my invention relates to a method and apparatus based on my discovery that the size of crystals formed, and hence the practical efficiency of the system, may be maximized by minimizing the temperature differential between the solution and the temperature of vaporization of the coolant.

A further phase of my invention relates to arrangements for compounding individual crystallization processes to take full advantage of my novel control system.

Yet another important phase of my invention relates to a parallel series arrangement of individual treating vessels wherein, corresponding parallel treating vessels of each series are mutually interconnected to a common coolant gas circuit to minimize the energy required for recompressing the coolant gas.

My invention is particularly applicable to the crystallization of potable water from saline water, wherein the crystallized solvent is the desired end product. However, it will be readily apparent that as a solvent is crystallized and removed from a solution, the solute content of the solution is concentrated. Accordingly, my invention is also applicable in the concentration of fruit juices, scaling liquors, heat sensitive liquors, etc., wherein the desired product in such cases is the concentrated solution remaining after the extraction of the crystallized solvent.

Volatile liquid coolants have been contemplated in the past for forming crystals of solvent. However, due to the extremely high pressures heretofore necessary to recompress the vaporized coolants prior to condensation, the lack of control over the amount of super-cooling produced in the solution as the coolant passed therethrough, and the lack of control over the size of crystals produced by the vaporization of the coolant, such known systems of crystallizing solvents from solution have not been entirely satisfactory, and certainly have not been commercially feasible. I have found that by injecting specific liquid hydrocarbons under controlled pressures into the solution to be treated, and by varying both the depth of the solution above the injection point and the pressure maintained on the surface of the solution, I can control the amount of super-cooling produced in the solution and the size or growth of the crystals produced.

When the crystallized solvent is the desired product, such as in the removal of potable water from saline water, the crystals produced must be of sufficient size so that the amount of saline solution adhering to the surface of the crystals is not disproportionate to the volume of solvent or potable water produced by the crystals. I have found that the differential in temperature ($\Delta T$) between the temperature of the solution being treated and the temperature at which the hydrocarbon vaporizes must be maintained at a minimum, or less than 10 Fahrenheit degrees in order to produce crystals of solvent having a sufficient size to feasibly extract the solvent from the adhering solution.

It thus is an object of my invention to provide an improved method of extracting solvent from a solution;

A further object of my invention is to provide an improved method of crystallizing solvent from a solution by controlling the vaporization of a liquid coolant passed through the solution to thereby control the super-cooling of the solution and the size of solvent crystals produced;

A further object of my invention is to provide a novel method of extracting and separating solvent from a solution by injecting an immiscible liquid hydrocarbon directly into the solution and causing it to vaporize under controlled conditions as it passes through the solution so as to extract heat therefrom and form crystals of solvent, wherein the amount of super-cooling of the solution and the crystal growth is controlled by varying the pressure on the surface of the solution and the hydrostatic head of the solution above the injection point of the hydrocarbon;

An additional object of my invention is to provide improved apparatus for facilitating the extraction of solvent from a solution; comprising:
(1) a vessel having an inclined surface extending over a major part of the lower portion of said vessel, said vessel being provided with an inlet for receiving solution to be treated, said vessel being adapted to maintain received solution in a pool, said vessel being further adapted to provide a vapor space at the pool surface;
(2) weir means for adjusting the depth of the pool and for thereby maintaining a predetermined hydrostatic head in the vessel;
(3) pressure control means for maintaining a predetermined pressure in the vapor space;
(4) means for introducing a relatively immiscible vaporizable liquid refrigerant at the lower portion of the vessel; and means to direct said refrigerant toward said inclined surface; and
(5) means for the mutual separation of crystals of solvent and residual solution formed by vaporization of introduced refrigerant in contact with solution in the vessel.

A still further object of my invention is to provide a system having a series of improved treating vessels for concurrently removing solvent from solution successively presented to the treating vessels in such series;

Another important object of my invention is to provide a system having a parallel series arrangement of improved treating vessels for concurrently removing solvent from solution which will be particularly useful in large installations;

These and other objects of my invention will be readily apparent to those skilled in the art from the following disclosure and accompanying drawings in which:

FIGURE 1 is a side elevation view in section of an improved treating vessel embodying my invention;

FIGURE 2 is an end elevational view in section of a treating vessel taken along line II—II of FIGURE 1;

FIGURE 3 is a diagrammatic view of a single treating vessel and its associated flow conduits and auxiliary mechanism showing the operative interrelationship between these various elements;

FIGURE 4 is a somewhat schematic diagram in elevation illustrating a system utilizing a series of treating vessels for concurrently removing solvent from solution in successive operations; and FIGURE 5 is a somewhat schematic view in perspective, illustrating a parallel series arrangement of treating vessels for concurrently removing solvent from solution.

In direct contact cooling systems, it is necessary that the coolant utilized is easily recompressible at a relatively low pressure. When the recompression requirements of a coolant are high, the amount of lost energy which must be put into the system is high, and accordingly the efficiency of such a system is relatively low. Alkanes have been contemplated as direct contact coolants in the past; however, they require relatively high recompression pressures in the order of about 25 to 50 p.s.i.g. at about 32° F. to facilitate condensation from their vapor state. Through research and experimentation in this field of crystal production by direct contact cooling, I have discovered that alkenes, such as butene-1, butene-2, and isobutene, make ideal coolants. In their vapor state, they are readily recompressible with pressures of less than 15 p.s.i.g. at about 32° F., or at pressures substantially lower than that required for the alkanes.

In addition to the necessity of low compressibility of the vaporized coolant, I have also found that it is imperative to control the cooling of the solution being treated so that the size of the crystals produced is of a maximum feasible diameter. The production of fines or extremely small crystals is undesirable, particularly where the crystals contain the desired product, and therefore the formation of such fines should be minimized. I have been able to regulate the amount of super-cooling in the solution and accordingly the size of crystals produced, by controlling the vaporization of the liquid coolant as it is passed through the solution. By varying the hydrostatic head of the solution being treated above the injection point of the liquid coolant and the pressure on the surface of such solution, the temperature at which the coolant will vaporize may be controlled.

In order to produce crystals of sufficient size so that it is commercially feasible to extract adhering treating solutions from the surface thereof, it is necessary that the $\Delta T$ between the temperature of the solution and the temperature at which the liquid coolant vaporizes be maintained at a minimum, or within 10 Fahrenheit degrees and preferably between 3 and 8 Fahrenheit degrees. In other words, I have found that the size of the crystals produced is inversely proportional to the temperature differential between the temperature of the solution and the temperature at which the liquid coolant vaporizes under the existing conditions. That is, as the $\Delta T$ is decreased, the size of the crystals of solvent is increased.

In carrying out my improved method, the solution to be treated is first precooled by heat exchangers and deaerated before being delivered to a treating vessel. The solution is preferably precooled to within about 1 to 5 Fahrenheit degrees above the crystallization or freezing point of the solution at the end or final concentration within the vessel. The precooled solution is then continuously introduced into a crystallizer or treating vessel at a suitable rate which may be about 4 to 10 feet per second. A pool of the solution is formed within the treating vessel and an immiscible liquid hydrocarbon coolant, such as butene, is then injected into a lower portion of the pool, concurrently with the flow of continuously introduced solution. Preferably, the temperature of the liquid hydrocarbon should be about the same as the temperature of the continuously introduced solution, or within about 5 Fahrenheit degrees above the crystallization temperature of the solution. The liquid hydrocarbon is introduced under pressure so that droplets thereof are dispersed throughout the solution. Further, the $\Delta P$ between the upstream pressure of the hydrocarbon and the back pressure exerted by the solution must be controlled so that the hydrocarbon is readily ejected away from the nozzles so as to prevent freezing directly at the nozzle orifice.

The height of the pool retained by the treating vessel may be varied such as by means of an adjustable weir positioned along an upper edge of the pool adjacent a discharge passageway. In addition, the pressure above the surface of the pool within the treating vessel is controllable such as by means of a control valve which may be positioned within an exhaust conduit for the vaporized hydrocarbon. The pressure on the surface of the pool may be maintained within about 1 to 5 p.s.i.g.

As the solution to be treated is continuously introduced into a lower portion of the treating vessel to form a pool of solution therewithin, the height of the variable weir may be adjusted to vary the depth of the pool, and accordingly vary the hydrostatic head of solution above the injection point of the hydrocarbon. As the depth of the pool reaches the height of the weir, solution from an upper portion of the pool will cotinuously overflow the weir and fall into the discharge passageway.

As the solution is continuously passed into and through the treating vessel, the injected immiscible liquid hydrocarbon vaporizes and abstracts heat from the solution at it rises upwardly therethrough. Since the vaporization of the hydrocarbon removes any remaining sensible heat and heat of crystallization from the solution, crystals of solvent are produced which float to the surface of the solution. The vaporized hydrocarbon also rises out of the solution and accumulates in a vapor space thereabove. By controlling the valve in the exhaust conduit, leading from the vapor zone, the pressure on the surface of the pool of solution may be varied. The amount of supercooling of the solution and the size of crystals formed may be controlled by so varying the pressure on the pool surface in conjunction with the variation of the hydrostatic head of the pool above the injection point of the hydrocarbon. Of prime importance in this connection is the control or minimization of the temperature differential or $\Delta T$ between the temperature of the solution in the pool and the temperature at which the hydrocarbon will vaporize under the existing conditions within the treating vessel.

It will be readily apparent that as the hydrocarbon vaporizes the temperature of the solution will continually be lowered; however, due to the continuous flow of solution through the treating vessel, the temperature of the solution therewithin may be maintained substantially constant. However, I have found that by successively delivering the cooled discharged solution to a series of successively aligned treating vessels, additional crystals of solvent may be removed in each such succeeding treating vessel by individually varying the hydrostatic head above the injection point of the hydrocarbon, in each successive pool, to compensate for the stepwise reduction in solution temperature produced in the preceding treating vessels. Here again, the function of such variation, together with the overall control of the pressure on the surface of the pools, is to minimize the $\Delta T$ between the temperature of the pool and the vaporization temperature of the hydrocarbon, and accordingly control the amount of super-cooling and size of crystals produced in each of the succeeding treating vessels.

As the crystals of solvent are formed in each of the treating vessels, a portion thereof are removed from the surface of the solution before being carried over the weir and into the discharge passageway. The percentage of crystals removed from the surface of the pool may be varied; however, it is desirable that a small percentage of the crystals overflow into the next treating vessel to act as nuclei for the formation of additional and larger crystals. The crystals from the various treating vessels are collected and delivered to a centrifuge wherein excess solution adhering to the surfaces thereof is removed by centrifugal force. If desired, the crystals may also be subjected to steam or pure solvent so as to facilitate the washing of their surfaces.

The vaporized hydrocarbon from each of the treating vessels is collected, recompressed, and delivered to a barometric or direct contact condenser. The solvent crystals are also delivered to the barometric condenser where the latent heat of fusion of the crystals is utilized to condense the vaporized hydrocarbon, resulting in the simultaneous liquification of the solvent. The hydrocarbon is then extracted from the solvent and reinjected back into the system for the formation of further crystals of solvent.

In very large installations, I have found that the overall efficiency may be improved by arranging several series of treating vessels in parallel. In such an arrangement the treating vessels in a single series are interconnected only through the solution conduit and accordingly, the gas chambers above each stage within a series are maintained independent. Corresponding parallel stages of the various series are mutually interconnected through a common ice delivery chute to a separate centrifuge and solvent treating system. Thus, each of the vessels within a parallel stage operate at the same gas pressure, whereas the gas pressures are individually controllable as between series stages. I have found that by successively delivering the cooled discharge solution to a series of successively aligned treating vessels, additional crystals of solvent may be removed in each succeeding treating vessel by decreasing the pressure on the surface of each successive pool to compensate for the stepwise reduction in solution temperature produced in the preceding treating vessels. Here again the hydrostatic head of each of the pools above the injection point above the hydrocarbon, together with the pressure on the surface of the pool, is varied so as to minimize the $\Delta T$ between the temperature of the pool and the vaporization temperature of the hydrocarbon, and accordingly, to control the amount of super-cooling and size of crystals produced in each of the succeeding treating vessels.

I have also found that the energy of recompression will be conserved if the exhaust gas from corresponding parallel chambers is maintained independent from the exhaust gas of the serially disposed chambers. Since each of the chambers within a series is maintained at an independent and successively lower pressure, the energy for recompressing the first stage or higher pressure is obviously less than the energy required for recompressing the exhaust gas from lower stages. If the various exhaust gases were mixed or otherwise combined for recompression, all would require recompression from the lowest pressure in the system and thus require a maximum energy input for such recompression.

Referring now to the drawings, and particularly FIGURES 1 and 2, a crystallizer or treating vessel 10 is shown having a lower portion 11 for retaining a pool 12 of solution to be treated, and an upper enclosing or housing portion 13, defining a vapor space, for maintaining pressure on the surface of the pool. An orifice 14 of an inlet conduit 15 is shown communicating with a lower portion of the treating vessel 10. A plurality of injection nozzles 16, connected to an inlet header 17, are shown positioned within the inlet conduit 15 for concurrent injection with incoming flow-through orifice 14.

A trough or chute 18, covered by the upper enclosing portion 13, extends along the side of the pool-retaining lower portion 11. A side member 19 separates the pool-retaining portion 11 from the chute 18. This chute either includes a connecting extension 18a which will be connected to a successive crystallizer 10 or a delivery extension 18d which will be connected to the completely enclosed centrifuge 40, see FIGURE 4. In either event, the extensions 18a or 18d are completely enclosed as by cover 18b to maintain the gas pressure within chamber 13. The crystal delivery system 18, 18a, 18d, 40, thus forms a closed chamber which does not allow any substantial escape of gas from the system.

A variable weir 20, adjacent an upper edge of the pool-retaining portion 11, is vertically adjustable to vary the height of the pool 12 retained within the portion 11. The weir 20 extends along one end of the portion 11 adjacent a discharge passageway or conduit 21. As indicated in FIGURE 1, a baffle 20a may be positioned above the weir 20 to reduce the amount of crystals which flow over the weir 20 and into the discharge conduit 21. In order to prevent the solution in the pool 12 from splashing or draining into the chute 18, the side member 19 has an upper portion 19a which extends above the maximum height of the weir 20.

A scraper device 22 for removing crystals from the surface of the pool 12 and delivering them to the chute 18 is housed within the upper portion 13 above the surface of the pool 12. The scraper device 22 is shown comprising an endless belt 23 having a plurality of paddles or blades 24 projecting outwardly therefrom. The belt is shown extending over a drive roller 25 along one end of the housing 13, and an idler roller 26 at the opposite end. A motor 27 transmits power to the drive roller 25 by any suitable coupling means, such as a chain or drive belt 28. The vertical positioning of the scraper 22 above the surface of the pool 12 may be varied and preset at a desired height by the screw and nut adjustment means 29, so that a given quantity or percentage of the crystals which are formed in the treating vessel may be removed from the surface of the pool 12 and delivered to the chute 18. The adjustment also permits a certain percentage of such crystals to flow over the weir 20 with the solution being discharged into the passageway 21 and onto a succeeding crystallizing unit or treating vessel. An exhaust conduit 30 communicates with an upper portion of the housing portion 13 for exhausting the vaporized coolant collected within the vapor space within the housing portion.

FIGURE 3 is a diagrammatic layout illustrating the functional interconnection of the necessary conduits and auxiliaries which may be used with a preferred embodiment of my invention. The crystallizer 10 receives precooled, deaerated solution from inlet 45, precooler 46, and conduit 15. The precooler 46 is a heat exchange device that is preferably connected to pass the concentrated solution discharged from the crystallizer by conduit 41, in a heat exchange relationship with respect to the incoming solution.

The crystallizer 10 is provided with a controlled supply of liquid butene by means of conduit 34 and valve 36 which is regulated by temperature responsive element 38 (see FIGURE 1). The amount of butene flowing at any given time may be observed from flow meter 39. The butene vapor from chamber 13 (FIGURE 1) is exhausted through valve 32 to conduit 30, compressor 42, condenser 43, and separator 47. The liquid butene discharged from separator 47 is returned to the butene supply conduit 34 for recirculation through the crystallizer 10.

The crystallizer 10 discharges ice crystals or crystals of other solvent through chute 18 to the completely enclosed centrifuge 40. The liquid adhering to the crystals is removed by the centrifuge and returned to drainline 41. Also, the crystals may be subjected to a treatment by either steam or liquid solvent to remove any impurities from their surface. The wash or treating fluid will also be returned to the drainline 41.

The relatively pure ice crystals are re-pulped in tank 40a and delivered through the condenser 43 where they yield their heat to aid in liquifying the butene. The particular condenser 43 shown will mix the solvent with the butene and so a separator 47 is provided for separating the now liquid solvent from the now liquid butene. The solvent so separated is discharged at the outlet 44.

As shown in FIGURE 4, a plurality of treating vessels 10, 10a, 10b, 10c and 10d are connected in series so as to currently extract crystals of solvent from solution successively presented to each of the treating vessels. Each of the succeeding treating vessels 10a, 10b, 10c and 10d are virtually identical to the previously described treating vessel or crystallizer 10. It will be noted, however, that the discharge passageway 21 of each preceding treating vessel communicates with the inlet conduit 15 of the next succeeding vessel so that the solution continuously discharged from an upper portion of the pool of the preceding treating vessel is continuously introduced into a lower portion of the pool in the next succeeding treating vessel.

It will be readily apparent that as the solution progresses from one vessel to another it not only becomes more concentrated due to the prior removal of solvent crystals in the preceding vessels, but also due to the extration of heat by the vaporization of the hydrocarbon in each of the preceding vessels, the temperature of the solution delivered to the next succeeding vessel is cooler than it was when it was delivered to the previous treating vessel. Accordingly, the height of the pool in each of the succeeding vessels and the injection rate of the coolant must be varied so as to maintain the $\Delta T$ between the temperature of each pool and the temperature at which the coolant vaporizes in each such vessel at a minimum.

As shown in FIGURE 4, all of the exhaust conduits 30, emanating from each of the treating vessels, are connected into an exhaust header 31. The pressure within each of the treating vessels, above the surface of the pool contained therewithin, may be varied by a control valve 32 positioned within each of the exhaust conduits 30. Each of the control valves 32 may be responsive to a pressure controller 33 which, in turn, is activated through a member 33a by the pressure within the vapor space above the surface of the solution in the particular treating vessel to which it is connected.

It is desirable to provide such independent chamber controls even though all of the chambers must operate at a common pressure due to the mutual fluid communication through chute 18. If each treating vessel is provided with its own exhaust conduit and control, the treating vessel may be designed and built without independent consideration for the particular system in which it will be employed. The exhaust conduit may be designed to handle the range of gas flows that can be expected to be produced by a single vessel. On the other hand, if a single exhaust conduit and control were provided for the whole system, its size and control valve characteristics would vary, depending upon how many vessels were being employed. Furthermore, where independent controls are provided for each pressure chamber, the response rate and hence, control stability of the system is increased by reducing the time lag required to exhaust sufficient gas to correct a pressure error.

A main header 34 having a plurality of conduits 35 supplies the inlet header 17 and injection nozzles 16 of each treating vessel with a flow of liquid coolant, preferably a hydrocarbon, such as butene. A control valve 36 is positioned within each of the conduits 35 to control the rate and volume of butene or other coolant injected into each of the treating vessels. Each of the control valves 36 is responsive to a temperature controller 37 having a temperature-responsive member 38 communicating with the pool-retaining portion 11 of the particular treating vessel concerned. The control valves 36 regulate the mass rate of coolant supply to the crystallizer 10 and hence control the rate of heat extraction to maintain a proper solution temperature for crystallization. A flow recorder 39 is preferably positioned on each of the conduits 35 to facilitate the control of butene to each of the treating vessels.

Although I have shown five such treating vessels in series along an inclined path in FIGURE 4, it will be understood that any number of such vessels may be utilized, as desired. The chute 18 is inclined and extended to run along the pool portion of each of the treating vessels, so as to receive the crystals of solvent extracted from each such vessel by the scraper devices 22. The crystals then proceed by gravity along the chute 18 and through final delivery portion 18d to a completely enclosed centrifuge 40, wherein solution adhering to the surface of such crystals is removed by centrifugal force. In addition, the surfaces of such crystals may be washed while in the centrifuge by any suitable means, such as be momentarily subjecting them to steam. The discharge passageway 41 of the end treating vessel 10d is directed to a heat exchanger wherein the cooled treated solution is utilized to precool the incoming solution to be introduced into the first treating vessel 10.

In carrying out my improved process for removing fresh or potable water from brackish or sea water, the sea water is first precooled and de-aerated by passing it through a heat exchanger counter-currently with previously treated or concentrated sea water, to cool the incoming sea water down to a temperature of about 30° to 32° F., or within 5 Fahrenheit degrees of the freezing point of sea water. The sea water is then introduced into the first crystallizer 10 and permitted to successively flow through the succeeding crystallizers 10a, 10b, 10c and 10d. Liquid butene is injected under controlled pressures into the various crystallizers or treating vessels by nozzles 16. The height of the pool contained in each of the crystallizers is adjusted by the variable weir 20, and the pressure upon the surfaces of the pools is adjusted by the control valves 32, in the exhaust conduits 30, so that the $\Delta T$ between the temperature of the solution contained in each of the treating vessels and the temperature at which the butene vaporizes in each such vessel is maintained at a minimum, or within 10 Fahrenheit degrees. Accordingly, as the butene passes through the pool of sea water contained in each treating vessel it vaporizes to form optimum sized crystals of fresh water. The scraper devices 22 are adjusted so that a given percentage of crystals are removed from the surface of the solution in each treating vessel while allowing a predetermined percentage to flow over the weir into the next treating vessel as nuclei for the formation of additional crystals of fresh water.

The crystals of fresh water from each treating vessel are collected in the chute 18 and delivered by gravity to the centrifuge 40 wherein adhering sea water is removed from the surface of the crystals by centrifugal force. In addition, the crystals may be washed while in the centrifuge either with water or by momentary subjection to steam. The use of steam materially reduces the amount of slurry produced during such a wash, without deleteriously melting the crystals. The crystals are then repulped in a slurry and delivered to a barometric condenser.

The vaporized butene from each of the treating vessels is exhausted through the conduits 30 to exhaust header 31 where it is collected and recompressed. The recompressed butene vapors are then delivered to the barometric condenser wherein the latent heat of fusion of the ice crystals is utilized to condense the butene back to its liquid state with the simultaneous melting of the ice crystals to form fresh water. Both the fresh water and the liquid butene are then sent to a separator wherein the butene is removed and reinjected back into the crystallizers, thus leaving the end product of fresh water.

In FIGURE 5, a parallel series arrangement of treating vessels is shown that I have found most efficient for large installations. The individual crystallizers 10 are substantially identical to those used alone as in FIGURES 1 and 2 or in a single series, as shown in FIGURE 4. For comparison purposes, a single crystallizer 10 is shown in FIGURE 5 with a portion broken away to illustrate its internal details.

In the parallel series arrangement shown, each series of crystallizers has a common solution path similar to the common path formed of inlet conduit 15, pool 12, outlet conduit 21, the next succeeding inlet conduit 15, etc. shown in FIGURE 4. The chutes for discharging ice crystals from the individual crystallizers are not mounted similarly to the common chute 18 of FIGURE 4, but are directed to a common manifold, such as 18′, 18″ or 18‴, which receives ice crystals from corresponding parallel crystallizers 10′, 10″, or 10‴. In this way, the gas pressure above the pools 12 within a series may be independently controlled, since there is no gas communication passage between the chambers 13.

I have found that the efficiency of recompression may be substantially increased in such a large system by maintaining separate circuits for the butene recompression and super-cooling. As shown in FIGURE 5, the upper or first stage crystallizers 10′ of each series are provided with a common exhaust manifold 31′ which carries the butene vapor to compressor 42′ and from thence to condenser 43′ which in turn delivers the liquified butene to inlet manifold 34′ for recirculation through the crystallizers. Each parallel stage of this arrangement is provided with a butene circuit such as that described above. As in the previous examples, the condenser may employ the melting ice from the centrifuges 40 as the necessary heat sink for liquifying the butene. However, for simplicity the secondary conduit to condenser 43′ has not been shown as connected to the centrifuge output conduit 44.

Except for the separate ice discharge chutes 18, the separate centrifuges 40 and the associated independent stage pressure control associated therewith, and the separate butene circuits 31, 42, 43, 34, the operation of this parallel series arrangement of crystallizers is substantially the same as the operation of either a single crystallizer, as shown in FIGURE 1, or a series of crystallizers, as shown in FIGURE 4.

Although I have set forth a preferred embodiment of the method of and apparatus for carrying out my invention, it will be readily apparent to those skilled in the art that various changes and modifications may be made thereto without departing from the spirit and scope of my invention, as defined in the appended claims.

What I claim is:
1. Apparatus for the crystallization of solvent from solution, said apparatus comprising:
 (1) a vessel having an inclined surface extending over a major part of the lower portion of said vessel, said vessel being provided with an inlet for receiving solution to be treated, said vessel being adapted to maintain received solution in a pool, said vessel being further adapted to provide a vapor space at the pool surface;
 (2) weir means for adjusting the depth of the pool and for thereby maintaining a predetermined hydrostatic head in the vessel;
 (3) pressure control means for maintaining a predetermined pressure in the vapor space;
 (4) means for introducing a relatively immiscible vaporizable liquid refrigerant at the lower portion of the vessel; and means to direct said refrigerant toward said inclined surface; and
 (5) means for the mutual separation of crystals of solvent and residual solution formed by vaporization of introduced refrigerant in contact with solution in the vessel.

2. Apparatus according to claim 1, said apparatus further comprising a trough mounted adjacent said vessel, and means for transferring crystals and adherent residual solution from said vessel and into said trough, said trough being in communciation with means for separating crystals from adherent residual solution.

References Cited by the Examiner

UNITED STATES PATENTS

| | | | |
|---|---|---|---|
| 2,602,745 | 7/1952 | Cunningham | 62—58 |
| 2,821,304 | 1/1958 | Zarchin | 62—58 |
| 2,887,851 | 5/1959 | Toulmin | 62—58 |
| 2,960,843 | 11/1960 | Zdansky | 62—123 |
| 3,019,611 | 2/1962 | Toulmin | 62—58 |
| 3,046,752 | 7/1962 | Margiloff | 62—123 |
| 3,069,864 | 12/1962 | Crosby | 62—58 |
| 3,170,778 | 2/1965 | Roth | 62—58 X |

FOREIGN PATENTS 217,766   10/1958   Australia.

NORMAN YUDKOFF, *Primary Examiner.*

G. HINES, *Assistant Examiner.*